US006792953B2

(12) United States Patent
Lesser et al.

(10) Patent No.: US 6,792,953 B2
(45) Date of Patent: Sep. 21, 2004

(54) TOBACCO SMOKE FILTER

(75) Inventors: Craig A. Lesser, Middletown, CA (US); Reid W. Von Borstel, Potomac, MD (US)

(73) Assignee: Filligent Limited, Central (HK)

( * ) Notice: Subject to any disclaimer, the term of this patent is extended or adjusted under 35 U.S.C. 154(b) by 0 days.

(21) Appl. No.: 10/380,294

(22) PCT Filed: Sep. 4, 2001

(86) PCT No.: PCT/US01/41997

§ 371 (c)(1),
(2), (4) Date: Mar. 10, 2003

(87) PCT Pub. No.: WO02/21948

PCT Pub. Date: Mar. 21, 2002

(65) Prior Publication Data

US 2003/0183239 A1 Oct. 2, 2003

Related U.S. Application Data

(60) Provisional application No. 60/232,048, filed on Sep. 12, 2000.

(51) Int. Cl.$^7$ .......................... A24D 3/14; C09B 62/00; D21H 23/00

(52) U.S. Cl. ...................... 131/334; 131/331; 131/335; 8/543; 162/139; 162/162

(58) Field of Search ............................. 8/543; 162/139, 162/162; 131/331, 332, 334, 335

(56) References Cited

U.S. PATENT DOCUMENTS

| | | | | |
|---|---|---|---|---|
| 2,882,120 | A | 4/1959 | Stoddard et al. | 8/105 |
| 3,279,476 | A | 10/1966 | Noznick | |
| 3,313,305 | A | 4/1967 | Noznick | |
| 3,658,070 | A | 4/1972 | Diluzio | |
| 3,674,540 | A | 7/1972 | Pergaminos | |
| 3,884,246 | A | 5/1975 | Walker | |
| 3,886,955 | A | 6/1975 | Johnson | |
| 3,982,897 | A | 9/1976 | Scheinberg | |
| 4,037,607 | A | 7/1977 | Grossman | |
| 4,076,031 | A | 2/1978 | Grossman | |
| 4,092,333 | A | 5/1978 | Mookherjee | |
| 4,096,158 | A | 6/1978 | Evers | |
| 4,126,141 | A | 11/1978 | Grossman | |
| 4,126,708 | A | 11/1978 | Mookherjee | |
| 4,138,413 | A | 2/1979 | Mookherjee | |
| 4,156,431 | A | 5/1979 | Epstein | |
| 4,194,517 | A | 3/1980 | Borowski | |
| 4,248,251 | A | 2/1981 | Bryant | |
| 4,257,430 | A | 3/1981 | Collins | |
| 4,258,730 | A | 3/1981 | Tsukamoto | |
| 4,260,523 | A | 4/1981 | Tsukamoto | |
| 4,333,484 | A | 6/1982 | Keritsis | |
| 4,396,026 | A | 8/1983 | Grossman | |
| 4,414,988 | A | 11/1983 | Yagi | |
| 4,434,804 | A | 3/1984 | Bolt | |
| 4,438,775 | A | 3/1984 | Mays | |
| 4,489,739 | A | 12/1984 | Mattina | |
| 4,506,684 | A | 3/1985 | Keritsis | |
| 4,508,525 | A | 4/1985 | Berger | |
| 4,532,947 | A | 8/1985 | Caseley | |
| 4,537,204 | A | 8/1985 | Gaisch | |
| 4,612,942 | A | 9/1986 | Dobberstein | |
| 4,761,277 | A | 8/1988 | Valdes | |
| 4,763,674 | A | 8/1988 | Lelah | |
| 4,848,376 | A | 7/1989 | Lilja | |
| 4,896,683 | A | 1/1990 | Cohen | |
| 4,946,968 | A | 8/1990 | Krimmer | |
| 4,964,426 | A | 10/1990 | Lee | |
| 5,009,239 | A | 4/1991 | Cohen | |
| 5,058,607 | A | 10/1991 | Carter | |
| 5,060,672 | A | 10/1991 | Irimi | |
| 5,218,096 | A | 6/1993 | Shibuya | |
| 5,244,880 | A | 9/1993 | Szentmiklosi | |
| 5,249,588 | A | 10/1993 | Brown | |
| 5,501,238 | A | 3/1996 | Von Borstel | |
| 5,746,231 | A | 5/1998 | Lesser | |
| 5,839,447 | A | 11/1998 | Lesser | |
| 5,860,428 | A | 1/1999 | Lesser | |
| 5,909,736 | A | 6/1999 | Stavridis et al. | 131/331 |
| 5,975,086 | A | 11/1999 | Lesser | |

FOREIGN PATENT DOCUMENTS

| | | | |
|---|---|---|---|
| DE | 2702234 | | 7/1978 |
| EP | 0058463 | | 2/1982 |
| EP | 0121436 | | 10/1984 |
| EP | 0402060 | | 12/1990 |
| EP | 0649607 | | 4/1995 |
| EP | 0649607 | A3 | 4/1995 |
| FR | A2149674 | | 3/1973 |
| GB | 1305369 | | 1/1973 |
| GB | 1435504 | | 5/1976 |
| JP | 4861695 | | 8/1973 |
| JP | 5032171 | | 3/1975 |
| JP | 5739767 | | 3/1982 |
| JP | 5768777 | | 4/1982 |
| JP | 57136375 | | 8/1982 |
| JP | 57138375 | | 8/1982 |
| JP | 59183684 | | 10/1984 |
| JP | 59183685 | | 10/1984 |
| JP | 6214774 | | 1/1987 |
| JP | 10513036 | | 11/1987 |
| JP | 62259574 | | 11/1987 |
| JP | 63152969 | | 6/1988 |
| JP | 63-204251 | * | 8/1988 |
| JP | 2184829 | | 7/1990 |
| SU | 1163832 | | 6/1985 |
| WO | WO 9600019 | | 1/1996 |
| WO | WO 9722268 | | 6/1997 |

OTHER PUBLICATIONS

Database WPI, Section CH, Week 198240; Derwent Publications Ltd., London, GB; AN 1982–84398E; XP–002270974.

Hayatsu, Hikoya et al., "Porphyrins as potential inhibitors against exposure to carcinogens and mutagens," *Mutation Research* 290:79–85 (1993).

* cited by examiner

*Primary Examiner*—Dionne A. Walls

(74) *Attorney, Agent, or Firm*—David A. Farah; Sheldon & Mak PC

(57) ABSTRACT

A tobacco smoke filter a copper-containing porphyrin or an iron analog of C.I. Reactive Blue 21 dye. A method of making a first tobacco smoke filter segment, comprising the steps of, first, providing one or more than one substance; producing a mixture of cellulose fiber and the substance; heating the mixture for a sufficient time at one or more than one temperature sufficient to covalently link the substance to the cellulose fiber; and forming the cellulose fiber with covalently bound substance into the first tobacco smoke filter segment. The substance can be a copper-containing porphyrin or an iron analog of C.I. Reactive Blue 21 dye.

66 Claims, No Drawings

TOBACCO SMOKE FILTER

CROSS-REFERENCE TO RELATED APPLICATION

This application claims priority from International Patent Application 371 of PCT/US01/41997, entitled "Tobacco Smoke Filter", filed Sep. 4, 2001, which is a Divisional of U.S. Provisional Patent Application 60/232,048, entitled "Cigarette Filter", filed Sep. 12, 2000; the contents of which are incorporated by reference herein in its entirety.

BACKGROUND

It is widely known that tobacco smoke contains mutagenic and carcinogenic compounds which cause substantial morbidity and mortality to smokers. Examples of such substances include polycyclic aromatic hydrocarbons (PAH) and nitrosamines.

Polycyclic aromatic hydrocarbons appear to cause toxicity by intercalating within DNA molecules. Nitrosamines are electrophilic, alkylating agents which are potent carcinogens. Nitrosamines are not present in fresh or green tobaccos and are not formed during combustion. They are instead formed by reactions involving free nitrate during processing and storage of tobacco, or by the post-inhalation, metabolic activation of secondary amines present in tobacco smoke.

Attempts to reduce the amount of toxic and mutagenic compounds that reach the smoker include tobacco smoke filters positioned between the burning tobacco and the smoker.

Conventional filters are made of cellulose acetate, with or without activated charcoal. These conventional filters, however, are only partially effective in reducing the amount of toxic and mutagenic compounds reaching the smoker. Further, conventional filters disadvantageously remove flavor compounds, thereby decreasing acceptance by the smoker.

There is, therefore, a need for an improved filter for a smokable device that substantially removes toxic and mutagenic compounds from tobacco smoke. Further, there is a need for an improved filter which allows the passage of flavor compounds while substantially removing toxic and mutagenic compounds from tobacco smoke. Such an improved filter would preferably be simple and inexpensive to manufacture, and convenient to use.

SUMMARY

The present invention is directed to a tobacco smoke filter that meets these needs. In one embodiment, there is provided a method of making a first tobacco smoke filter segment. The method comprises the steps of, first, providing one or more than one copper-containing porphyrin. Then, a mixture of cellulose fiber and the copper-containing porphyrin is produced. Next, the mixture is heated for a sufficient time at one or more than one temperature sufficient to covalently link the copper-containing porphyrin to the cellulose fiber. Then, the cellulose fiber with covalently bound, copper-containing porphyrin is formed into the first tobacco smoke filter segment.

In one embodiment, the copper-containing porphyrin provided is a copper phthalocyanine. In a preferred embodiment, the copper-containing porphyrin provided is C.I. Reactive Blue 21 dye. In another embodiment, the mixture of cellulose fiber and the copper-containing porphyrin produced comprises a ratio of about 1.2:10 copper-containing porphyrin to cellulose fiber by weight. In a preferred embodiment, the mixture of cellulose fiber and the copper-containing porphyrin further comprises sodium sulfate and chlorine water.

In one embodiment, The method further comprises rinsing the mixture of cellulose fiber with covalently bound, copper-containing porphyrin after heating the mixture. In another embodiment, the method further comprising adding one or more than one additional substance to the cellulose fiber with covalently bound, copper-containing porphyrin. In one embodiment, the one or more than one additional substance is selected from the group consisting of activated charcoal, chitin and lignin. In another embodiment, the one or more than one additional substance is selected from the group consisting of an antioxidant, dry water, a humectant, microcapsules, a radical scavenger, a surfactant and combinations of the preceding.

According to one embodiment, there is provided a method of making a smokable device. The method comprises the steps of, first, providing a first tobacco smoke filter segment made according to the present invention, and then affixing the first tobacco smoke filter segment to a body of divided tobacco. The method can further comprise the step of affixing a second tobacco smoke filter segment that is substantially free of copper-containing porphyrin to the body of divided tobacco. In a preferred embodiment, the second tobacco smoke filter segment affixed to the body of divided tobacco comprises cellulose acetate fibers treated with triacetin.

According to one embodiment of the present invention, there is provided a tobacco smoke filter comprising a first tobacco smoke filter segment made according to the present invention. The tobacco smoke filter can also comprise a second tobacco smoke filter segment that is substantially free of copper-containing porphyrin. According to another embodiment, there is provided a smokable device comprising the tobacco smoke filter according to the present invention affixed to a body of divided tobacco.

According to one embodiment of the present invention, there is provided a method of filtering tobacco smoke. The method comprises the steps of providing the smokable device of according to the present invention, igniting the body of divided tobacco such that smoke passes through the body of divided tobacco and into the filter, and allowing the smoke to pass through the filter thereby filtering the smoke.

The present invention further comprises an iron analog of C.I. Reactive Blue 21 dye and methods, tobacco smoke filters and smokable devices of the present invention, where the iron analog of C.I. Reactive Blue 21 dye is substituted for the copper-containing porphyrin. Additionally, there is provided.

DESCRIPTION

According to one embodiment of the present invention, there is provided a filter for tobacco smoke. The filter can be provided in combination with cigarettes or cigars or other smokable devices containing divided tobacco. Preferably, the filter is secured to one end of the smokable device, positioned such that smoke produced from the tobacco passes into the filter before entering the smoker. The filter can also be provided by itself, in a form suitable for attachment to a cigarette, cigar, pipe, or other smokable device.

The filter according to the present invention advantageously removes a significant proportion of mutagens and carcinogens from cigarette smoke. The filter further retains satisfactory or improved smoke flavor, nicotine content, and draw characteristics. The filter is designed to be acceptable to the user, being neither cumbersome nor unattractive as are commercially made filters which are designed to add onto the ends of premade cigarettes. Further, filters according to the present invention can be made of inexpensive, safe and effective components, and can be manufactured with only minor modifications of standard cigarette manufacturing machinery.

According to one embodiment of the present invention, the filter comprises a porous substrate. The porous substrate can be any nontoxic material suitable for use in filters for smokable devices that are also suitable for incorporation with the other substances according to embodiments of the present invention. Such porous substrates include cellulosic fiber such as cellulose acetate, cotton, wood pulp, and paper; and polyesters, polyolefins, ion exchange materials and other materials as will be understood by those with skill in the art with reference to this disclosure.

Filter Containing a Humectant

According to one embodiment of the present invention, the filter comprises at least one humectant, with or without other substances disclosed in this disclosure. The humectant is capable of absorbing moisture from tobacco smoke and releasing it into the porous substrate in order to wet-filter tobacco smoke that passes through the filter. Among other advantages, wet-filtration systems according to the present invention help remove particulate matter from tobacco smoke and can be made integral with a tobacco containing product.

The humectant can be any suitable humectant. For example, the humectant can be selected from the group consisting of glycerol, sorbitol, propylene glycol, sodium lactate, calcium chloride, potassium phosphate, sodium pyrophosphate or sodium polyphosphate, calcium citrate, calcium gluconate, potassium citrate, potassium gluconate, sodium tartrate, sodium potassium tartrate, and sodium glutamate.

In a preferred embodiment, the humectant incorporated into the filter is sodium pyroglutamate (also known as sodium 2-pyrrolidone-5-carboxylate or NaPCA). Advantageously, sodium pyroglutamate is nontoxic, effective at removing charged particles from tobacco smoke and functions as a humectant in the temperature range of tobacco smoke. Further, it is nonhazardous, stable, simple to manufacture and convenient to use. Sodium pyroglutamate has the following structure:

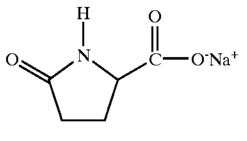

Filters according to the present invention are simple and inexpensive to manufacture. In one method of manufacture, a solution containing the humectant, such as sodium pyroglutamate, is prepared. Then, the porous substrate is wetted with the solution. The wetted substrate is then dried, leaving a residue of the humectant dispersed on or in the porous substrate. In a preferred embodiment, the humectant is present in an amount of from about 5% to about 60% by dry weight of the filter.

The effectiveness of a tobacco smoke filter containing sodium pyroglutamate according to the present invention was tested as follows.

Three types of filters were tested for relative effectiveness in removing tar from cigarette smoke:

1) Conventional cellulose acetate filter ("Cell-Ac");
2) Wet-filtration tobacco smoke filter containing cellulose acetate with sodium pyroglutamate ("SoPyro") according to the present invention; and
3) Commercially available wet-filtration tobacco smoke filter (Aquafilter®, Aquafilter Corp.).

Cellulose acetate filters containing sodium pyroglutamate were prepared by, first, removing cellulosic filters from commercial cigarettes. The fibers weighed approximately 0.21 g. Next, approximately 0.5 mL of a 10% by weight solution of sodium pyroglutamate was applied to each filter, and the filter was dried overnight at 60° C.

The conventional cellulose acetate filter and the cellulose acetate filters containing sodium pyroglutamate were weighed and inserted into a 40 mm segment of polycarbonate tubing having an inside diameter identical to the outside diameter of a standard cigarette. A filterless cigarette having 0.85 g of tobacco was inserted into one end of the polycarbonate tubing in proximity to one end of the filter. The other end of the polycarbonate tubing was attached to tubing connected to a suction pump. Duplicates of each filter type were tested. Each Aquafilter® used in this test was also attached to a filterless cigarette having 0.85 g of tobacco and then attached to tubing connected to a suction pump.

The filtered cigarettes were lit and intermittent suction, simulating inhalation of cigarette smoke, was applied until the cigarette had burned to within 12.5 mm of the unlit end. The filters were removed from either the polycarbonate tube or were removed from the Aquafilter®, weighed, and placed in 10 mL of methanol to elute tar and other substances from the smoke that were retained in the filter. Light absorbance (at a wavelength of 350 nm) of the ethanolic filter eluates was used as an index of the amount of smoke components retained on the filters. The weight gained by the filters during smoke passage was also recorded. The results of the test are presented in Table 1.

TABLE 1

| TEST | FILTER | ABSORBANCE at 350 nm | Weight Gain |
|---|---|---|---|
| 1 | Cell-Ac | 0.470 A.U. | 35 mg |
| 2 | Cell-Ac | 0.381 A.U. | 30 mg |
| 3 | SoPyro | 0.731 A.U. | 71 mg |
| 4 | SoPyro | 0.625 A.U. | 60 mg |
| 5 | Aquafilter ® | 0.540 A.U. | * |
| 6 | Aquafilter ® | 0.560 A.U. | * |

*The weight gain due to absorbance of smoke components on the Aquafilter could not be determined, since the Aquafilter actually lost weight during passage of smoke, presumably due to evaporation of water.

Based on the absorbance data, the filters according to one embodiment of the present invention (Tests 3 and 4) are significantly more effective than conventional cellulose acetate filters without the humectant (Tests 1 and 2), and also more effective than the Aquafilter® (Tests 5 and 6).

Filter Containing Dry Water

According to another embodiment of the present invention, there is provided a filter for wet-filtering tobacco smoke comprising "dry water," with or without other substances disclosed in this disclosure. Dry water is a combination of methylated silica and water. In one embodiment, the methylated silica is present in an amount from about 5% to 40% and the water is present in an amount from about 60%to 95% by weight. In a preferred embodiment, the methylated silica is present in an amount of about 10% and the water is present in an amount of about 90% by weight. Advantageously, dry water has good stability when used in a filter according to the present invention. Further, it is inexpensive, nontoxic and not harmful to the environment.

In a preferred embodiment, dry water is present in an amount of about 1% to about 20% by weight of the filter. In a particularly preferred embodiment, dry water is present in an amount of about 5% to about 10% by weight of the filter.

Dry water for use with the present invention can be made, for example, by shaking excess water with methylated silica in a closed container until an equilibrium emulsion is achieved. Excess water is decanted, and a drying agent, such as non-derivatized silica, is added in amounts equivalent to 10% of the amount of methylated silica in the emulsion. The emulsion is further shaken to disperse the drying agent.

One problem associated with the use of dry water in a tobacco smoke filter is that, when present as a continuous layer between the tobacco and the smoker, dry water tends to clog pores in the filter, thereby increasing resistance to airflow and decreasing smoking pleasure. In order to overcome this problem, there is provided an embodiment of the present invention having dry water admixed with a loose fibrous material. This additional fibrous material provides scaffolding to reduce impaction of silica particles into the filter material when suction is applied by the smoker. Examples of such material include cellulose or cellulose acetate having fiber lengths short enough such that the dry water behaves as a flowable powder. In a preferred embodiment, the fiber length is less than about 1 nm. In a preferred embodiment, the tobacco smoke filter according to the present invention includes both a porphyrin, as discussed in this disclosure, in addition to the dry water. For example, a tobacco smoke filter according to the present invention includes a section of between about 3 mm and 6 mm filled with dry water, chlorophyllin and cellulose, within the filter or at the distal end of the filter between the conventional filter material and the tobacco. Tobacco smoke in such a filter passes through the dry water and porphyrin which retain carcinogenic smoke constituents within the dry water and chlorophyllin layer.

Tobacco smoke filters according to this aspect of the present invention can be made by adding a dry water and porphyrin mixture during manufacture of the filter or can be made by injecting the mixture into the filter or at the interface between the tobacco and the conventional filter. The dry water and porphyrin mixture can be injected either into the axial end of the filter or through the side of the smokable device, such as through a cannula attached to an injection device. Preferably, the injection device meters the amount of material administered per each injection.

Alternately, the dry water and porphyrin mixture can be included in a filter extension for attachment to a conventional smokable device such as a standard cigarette, or to a cigarette filter by the smoker. The filter extension comprises a layer of dry water and porphyrin and, preferably, a fibrous material as a matrix. The filter extension further comprises a sleeve which extends axially forward for fitting over the proximal end of the smokable device. The sleeve is bounded by a porous retaining element to maintain the dry water and porphyrin within the filter extension. Preferably, the sleeve further comprises a length of conventional filter material such that, upon connection to the smokable device, the filter extension and smokable device appear to substantially be a conventional smokable device.

Filters Containing a Copper-Containing Porphyrin

According to another embodiment of the present invention, there is provided a cigarette filter comprising at least one porphyrin, such as chlorophyll, with or without other substances disclosed in this disclosure. Preferably, the porphyrin is a copper-containing porphyrin, such as chlorophyllin and copper phthalocyanine trisulfonate (copper phthalocyanine, copper phthalocyanate).

Porphyrins are planar compounds which inactivate several classes of mutagens and carcinogens. Porphyrins inactivate planar mutagens and carcinogens primarily by binding the carcinogen to the planar porphyrin structure through hydrophobic interactions. Therefore, porphyrins ideally need to be maintained in aqueous environments to optimally adsorb these tobacco smoke carcinogens. Porphyrins further inactivate carcinogens by binding polycyclic aromatic hydrocarbons (PAH) through $\pi$—$\pi$ (pi—pi) bonding. The copper-containing porphyrins also inactivate many classes of non-planar mutagens and carcinogens including some nitrosamines through reaction with the copper ion. While known to inactivate various carcinogens, it has not been known how to effectively utilize porphyrins in tobacco smoke filters.

Chlorophyllin is a naturally occurring, copper-containing porphyrin and is the stable form of chlorophyll in which the magnesium present in chlorophyll has been replaced by copper. Chlorophyllin has the following formula:

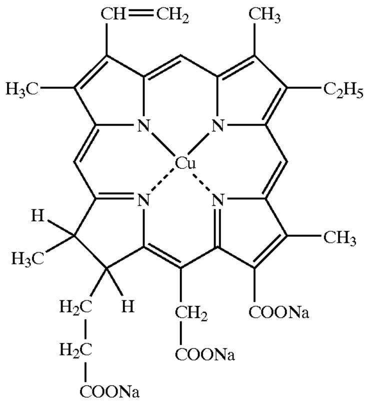

Chlorophyllin

Chlorophyllin, however, is difficult to chemically link to tobacco smoke filter components. Therefore, in a preferred embodiment, the copper-containing porphyrin incorporated into the tobacco smoke filter is copper phthalocyanine. Copper phthalocyanine is a nontoxic, synthetic chlorophyllin analog which can be more easily linked to tobacco smoke filter components than chlorophyllin. Copper phthalocyanine has the following formula:

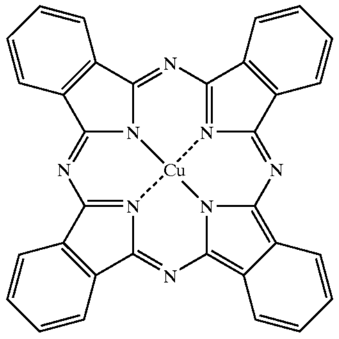

Cu-Phthalocyanine

In one embodiment, the copper-containing porphyrin, such as copper phthalocyanine, is incorporated into a tobacco smoke filter by directly adding the copper-containing porphyrin to the tobacco smoke filter. In a preferred embodiment, the copper phthalocyanine can be incorporated into a tobacco smoke filter as a covalently bound ligand to cotton, such as the textile dye "blue cotton," or as a covalently bound ligand to rayon, such as "blue rayon," or as a covalently bound ligand to other suitable material as will be understood by those in the art with reference to this disclosure. In another preferred embodiment, copper phthalocyanine can be incorporated into a tobacco smoke filter in combination with other tobacco smoke filter embodiments of the present invention.

Copper-containing porphyrin is preferably attached to cellulosic fibers in the form of an activated reagent called C.I. Reactive Blue 21 dye, a vinylsulfone derivative of copper phthalocyanine trisulfonate, as described in Hayatsu, Journal of Chromatography, 597:37–56 (1992), incorporated in this disclosure by reference in its entirety, which forms a stable ether linkage to free hydroxyl groups on cellulosic fibers to form "blue cellulose" or other materials under mild conditions (unlike chlorophyllin).

Cellulose is the base material used to manufacture tobacco smoke filters. The standard form of cellulose used for manufacturing tobacco smoke filters is cellulose acetate fibers, made by treating cellulose with acetic anhydride. This reaction replaces the free hydroxyl groups present on natural cellulose with more hydrophobic acetate groups. The cellulose acetate is then treated with triacetin (glycerol triacetate), a solvent that joins some of the cellulose acetate fibers together because cellulose acetate, unlike cellulose is partially soluble in triacetin. Disadvantageously, however, replacing the hydroxyl groups with acetate groups and treating the cellulose with triacetin greatly diminishes the number of potential attachment sites for copper-containing porphyrin molecules and renders triacetin treated-cellulose acetate less desirable as a base material for tobacco smoke filters that untreated cellulose.

Therefore, according to one embodiment of the present invention, there is provided a tobacco smoke filter comprising one or more than one segment, that is, at least a first segment. The first segment comprises copper-containing porphyrin and cellulose that has not been treated with acetic anhydride or triacetin. Preferably, the tobacco smoke filter further comprises a second segment that comprises cellulose acetate treated with triacetin but that is substantially free of copper-containing porphyrin.

In a preferred embodiment, the copper-containing porphyrin in the first segment is present in an amount of from about 0.1% to about 5% by dry weight of the filter covalently bound. In a particularly preferred embodiment, the copper-containing porphyrin in the first segment is present in an amount of from about 1% to about 3% by dry weight of the filter.

In one embodiment of the present invention, there is provided a smokable device comprising a body of divided tobacco affixed to a tobacco smoke filter comprising the first segment. Preferably, the smokable device comprises the first segment adjacent the body of divided tobacco and a second segment adjacent that is at the proximal end of the smokable device. This configuration advantageously allows a user of the smokable device to draw smoke directly through the second segment of the tobacco smoke filter, thereby obtaining a convention feel while using the smokable device.

In another embodiment of the present invention, there is provided a method of making a tobacco smoke filter as disclosed in this disclosure. The method produces a tobacco smoke filter comprising copper-containing porphyrin, such as copper phthalocyanine, that tends to stay uniformly dispersed in the filter during the manufacturing process and as moisture accumulates in the filter during the burning of the tobacco, and that tends not to leach out of the filter during use.

The method comprises preparing the filter material from cellulose or from other materials to which one or more than one copper-containing porphyrin has been covalently bound. The filter material is Fen made into tobacco smoke filters comprising at least one segment of the material with covalently bound, copper-containing porphyrin. The tobacco smoke filter can also comprise one or more than one segment of material that is substantially free of copper-containing porphyrin. The use of filter material comprising covalently bound, copper-containing porphyrin permits high speed, high-volume manufacturing of smokable devices, such as cigarettes, incorporating a filter according to the present invention using existing equipment.

The method comprises the steps of, first providing one or more than one copper-containing porphyrin, such as copper phthalocyanine. In a preferred embodiment, the copper-containing porphyrin is a vinylsulfone derivative of copper phthalocyanine trisulfonate, such as C.I. Reactive Blue 21 dye (ORCO® REACTIVE Turquoise RP, available from Organic Dyestuffs Corporation, East Providence, RI US).

The amounts of material given in the following steps are relative amounts and are for example, only. The amounts would be scaled upward for commercial production as will be understood by those in the art with reference to this disclosure. After providing the copper-containing porphyrin, a mixture is produced comprising a ratio of about 1.2:10 copper-containing porphyrin to cellulose fiber by weight, such as approximately 1.2 g of the copper-containing porphyrin and approximately 10 g of cellulose fiber of a grade suitable for use as paper-making pulp. The mixture further comprises approximately 10 g of sodium sulfate in approximately 200 mL of chlorine water. Then, the mixture is heated to about 30° C. for about 35 minutes, after which, the temperature is raised to about 70° C. for about 60 minutes to complete the covalent binding of the copper-containing porphyrin to the cellulose fiber. The mixture is then collected on a mesh and rinsed thoroughly under running tap water, producing cellulose fiber with covalently bound, copper-containing porphyrin. The cellulose fiber with covalently bound, copper-containing porphyrin is then formed into a segment of a tobacco smoke filter using commercially available equipment. The filter is then attached to a body of divided tobacco to produce a smokable device according to the present invention. Additionally, the present invention comprises copper-containing porphyrin impregnated paper made as disclosed above, for use in making tobacco smoke filters or for other uses.

The method of method of making a tobacco smoke filter can further comprise adding one or more than one additional substance to the tobacco smoke filter of the present invention in addition to copper-containing porphyrin. In a preferred embodiment, the one or more than one additional substance is chitin, a polysaccharide derived from the shells of arthropods, because chitin particles comprise a high density of free hydroxyl groups that can be covalently attached to metal-porphyrin compounds, such as C.I. Reactive Blue 21 dye. By dry weight, chitin can be covalently bound to about four times as much C.I. Reactive Blue 21 dye as an equivalent amount of cellulose. In a preferred embodiment, chitin granules (available from Sigma Chemical Company, St. Louis, Mo. US) are covalently bound to copper-containing porphyrin in method equivalent to the reaction disclosed above in which the cellulose is replaced with chitin. The amounts of material given in the following steps are relative amounts and are for example, only. The amounts would be scaled upward for commercial production as will be understood by those in the art with reference to this disclosure. This can be accomplished by, for example, dissolving 0.8 g C.I. Reactive Blue 21 dye and 6.8 g sodium sulfate in 133 mL of distilled water. Then, 2.0 g of chitin are added and the mixture is stirred gently for 20 minutes at 30° C. Next, 2.7 g of sodium carbonate are added and the mixture is allowed to stand at 30° C. for 15 minutes and is then heated from 30° C. to 70° C. over the course of 20 minutes. The mixture is then stirred while maintaining a temperature of 70° C. for 60 minutes, to allow the linking reaction to go to completion. The resulting copper phthalocyanine-derivatized chitin is collected in a sintered glass filter and rinsed thoroughly with distilled water to remove unreacted dye and the salts.

The copper-containing porphyrin covalently bound to chitin can be incorporated into paper by mixing it with cellulose pulp in a ratio of between about 1:20 and about 1:1 copper-containing porphyrin covalently bound to chitin to cellulose by dry weight. The cellulose can also comprise covalently bound copper-containing porphyrin according to the present invention. The incorporation comprises mixing the chitin with cellulose pulp in the initial step of paper making, as the cellulose is being macerated in water (before the pulp is laid out on a mesh, pressed and dried). The chitin-impregnated cellulose can then be used for manufacture of tobacco smoke filters according to the present invention.

In a preferred embodiment, the one or more than one additional substance is activated charcoal or is lignin (a constituent of wood produced as a byproduct of preparation of cellulose paper pulp from wood). Either or both of these substances can be added to cellulose covalently bound to copper-containing porphyrin according to the present invention, especially for fabrication of paper incorporating activated charcoal or lignin . When present, activated charcoal or lignin is added to the cellulose in the same manner and ratio as chitin disclosed above.

Further, in a preferred embodiment the filter produced as disclosed above is attached to a tobacco smoke filter made of standard cellulose acetate fibers treated with triacetin to produce a filter comprising at least two segments. Preferably, the segment comprising cellulose acetate fibers treated with triacetin is proximal, that is away from the lit end of the smokable device, to the segment comprising copper-containing porphyrin impregnated cellulose fibers, and the segment comprising copper-containing porphyrin impregnated cellulose fibers is between the body of divided tobacco and the segment comprising cellulose acetate fibers treated with triacetin.

The effectiveness of a two segment filter made according to the present invention was tested as follows. Tobacco smoke filter were prepared comprising two segments. Each proximal segment comprised cellulose acetate fibers treated with triacetin. The distal segment of one filter comprised copper phthalocyanine impregnated cellulose fibers as disclosed above, while the distal segment of the other filter comprised cellulose fibers that were not treated with triacetin and that were not impregnated with a copper-containing porphyrin. The two segment filters were then placed in plastic tubing leaving approximately 0.5 cm of the tube without the filter, and a 3 cm long rod of tobacco from a Marlboro® cigarette was fitted into the 0.5 cm empty end of the tubing abutting the filter to create smokable devices. The tobacco was lit and the smokable devices were subjected to ten 20 mL puffs with a suction pump, until the tobacco was burned down flush with the end of the plastic tube. The filters were removed from the tubes and placed in 10 mL of methanol containing ammonia in a 50:1 dilution to elute the retained polycyclic aromatic hydrocarbons from the filters. The 10 mL extracts were evaporated down to 1 mL and subjected to thin layer chromatography on aluminum oxide with 5 mL hexane. Total polycyclic aromatic hydrocarbon content was estimated spectrofluorimeterically. The results indicated that the two segment filter comprising copper phthalocyanine according to the present invention retained 80 ng of polycyclic aromatic hydrocarbons while the two segment filter without copper phthalocyanine retained 6 ng of polycyclic aromatic hydrocarbons. This 13-fold increase is particularly significant in that the total polycyclic aromatic hydrocarbons produced during combustion of the tobacco rod is estimated to be between about 100 ng and 200 ng. Therefore, the two segment filter according to the present invention removed between about 40% and 80% of the total amount of polycyclic aromatic hydrocarbons from the tobacco smoke.

In another embodiment, the tobacco smoke filter of the present invention comprises an iron analog of the copper-containing porphyrin rather than the copper-containing porphyrin. In a preferred embodiment, the analog is an iron analog of C.I. Reactive Blue 21 dye produced by acidification of the C.I. Reactive Blue 21 dye, addition of iron sulfate and then addition of a suitable base, as will be understood by those in the art with reference to this disclosure. Alternately, an iron salt, such as anhydrous iron chloride, can be used instead of a copper salt during initial synthesis of C.I. Reactive Blue 21 dye to produce an iron analog.

The iron analog of C.I. Reactive Blue 21 dye can also be used to make paper impregnated with iron analog of C.I. Reactive Blue 21 dye, corresponding to the copper-containing porphyrin impregnated paper as disclosed above, for use in making tobacco smoke filters or for other uses.

Filter Containing Microcapsules

According to another embodiment of the present invention, there is provided a filter for tobacco smoke comprising a porous substrate having microcapsules dispersed in the porous substrate, with or without other substances disclosed in this disclosure. The microcapsules preferentially include an inner core with an outer shell.

The cores of the microcapsules comprise at least one vegetable oil. Suitable vegetable oils include at least one oil selected from the group consisting of castor oil, cotton seed oil, corn oil, sunflower oil, sesame oil, soybean oil, and rape oil. In a preferred embodiment, the vegetable oil is safflower oil. Other oils are also suitable, as will be understood by those with skill in the art with reference to this disclosure. In a preferred embodiment, the vegetable oil is present in an amount of from about 20% to about 80% by dry weight of the microcapsules, and more preferably from about 30% to about 70% by dry weight of the microcapsules.

In a preferred embodiment, the microcapsule cores also contain a porphyrin, such as chlorophyllin, or another porphyrin such copper phthalocyanine. When present, the chlorophyllin is preferably present in an amount of from about 1% to about 10% by dry weight of the microcapsules, and more preferably from about 2% to about 5% by dry weight of the microcapsules.

In a preferred embodiment, the microcapsule shells comprise a humectant. In a preferred embodiment, the humectant is sodium pyroglutamate, though other humectants can be used as will be understood by those with skill in the art with reference to this disclosure. In a preferred embodiment, the humectant, such as sodium pyroglutamate, is present in an amount of from about 10% to about 90% by dry weight of the microcapsules, and more preferably from about 20% to about 70% by dry weight of the microcapsules.

In another preferred embodiment, the microcapsule shells also comprise methylcellulose. In a preferred embodiment, the methylcellulose is present in an amount of from about 5% to about 30% by dry weight of the microcapsules, and more preferably from about 10% to about 25% by dry weight of the microcapsules.

In another preferred embodiment, the microcapsule shells comprises a polymeric agent such as polyvinylalcohol or polyvinyl pyrrolidone, or can comprise both polyvinylalcohol and polyvinyl pyrrolidone, in addition to methylcellulose or in place of methylcellulose. In a preferred embodiment, the polymeric agent is present in an amount of from about 2% to about 30% by dry weight of the microcapsules, and more preferably from about 5% to about 20% by dry weight of the microcapsules.

Compounds used in formulation of microcapsules according to the present invention are available from a variety of sources known to those with skill in the art, such as Sigma Chemical Co., St. Louis, Mo. US.

Microcapsules suitable for use in the present invention can be made according to a variety of methods known to those with skill in the art. For example, microcapsules according to the present invention can be produced by combining 200 g of vegetable oil with 500 g of an aqueous suspension comprising 25 g of low-viscosity methylcellulose, 5 g of chlorophyllin, 50 g of sodium pyroglutamate and 150 g of corn starch in water. The mixture is emulsified and spray-dried to form microcapsules.

Microcapsules according to the present invention can be formed by spray drying methods at the site-of cigarette manufacturing machinery by spraying onto sheets of cellulose acetate filter tow before the tow is formed into cylindrical filters. Alternatively, suitable microcapsules can be premanufactured and added to sheets of cellulose acetate filter tow by dropping the microcapsules onto the tow with a vibrating pan or by other techniques as will be understood by those with skill in the art with reference to this disclosure. Further, microcapsules can be incorporated into prefabricated filters by sprinkling the microcapsules into the filter tow before the tow is rolled and shaped in rods of filter material.

As will be appreciated by those with skill in the art, the manufacture of filters containing microcapsules according to the present invention will require only minor modification of conventional filter-cigarette manufacturing equipment. Further, the manufacture of filters containing microcapsules according to the present invention is only marginally more expensive than conventional filters.

In use, the humectant portions of the microcapsules trap moisture from tobacco smoke passing through the filter. Sodium pyroglutamate is particularly preferred because it can be incorporated into the filter in a dry form.

When present, the oil portions of the microcapsules trap certain harmful volatile compounds like pyridine without impeding the flow of flavor and aroma producing compounds. When present, chlorophyllin is a potent inactivator of carcinogenic components of tobacco smoke.

The methylcellulose portions of the microcapsules impart structural stability to the microcapsules but disperse upon warming and when exposed to moisture. Unlike most commonly used viscosity-imparting substances, methylcellulose precipitates from warm solutions. Further, it is soluble at lower temperatures than most commonly used viscosity-imparting substances.

When tobacco smoke filters containing microcapsules comprising a shell of sodium pyroglutamate and methylcellulose and a core of vegetable oil and chlorophyllin, according to the present invention, filter tobacco smoke, the microcapsules capture heat and moisture from the tobacco smoke. The methylcellulose precipitates into a fibrous material which increases the effective surface area available for wet-filtration of the tobacco smoke. This allows the moisture retained by the sodium pyroglutamate to rapidly disperse into the filter material. The chlorophyllin partitions approximately evenly between the aqueous and oil environments, allowing increased inactivation of both particulate and vapor-phase toxic and mutagenic compounds of tobacco smoke than if the chlorophyllin was available in only one phase.

Filters Containing a Surfactant

In another preferred embodiment, the filters of the present invention additionally comprise at least one surfactant to improve the effectiveness of the tobacco smoke filter, with or without other substances disclosed in this disclosure. In a particularly preferred embodiment, the surfactant is present in an amount of from about 0.1% to about 10%, and more preferably from about 0.1% to about 2% by weight of the filter.

The surfactant is preferably nontoxic and can include one or more of the following classes of compounds: (1) a polyoxyalkylene derivative of a sorbitan fatty acid ester (i.e., polyoxyalkylene sorbitan esters), (2) a fatty acid monoester of a polyhydroxy-alcohol, or (3) a fatty acid diester of a polyhydroxy alcohol, though other suitable surfactants will be understood by those with skill in the art with reference to the disclosure in this disclosure. Examples of suitable surfactants include ethoxylates, carboxylic acid esters, glycerol esters, polyoxyethylene esters, anhydrosorbitol esters, ethoxylated anhydrosorbitol esters, ethoxylated natural fats, oils and waxes, glycol esters of fatty acids, polyoxyethylene fatty acid amides, polyalkylene oxide block copolymers, and poly(oxyethylene-consist of-oxypropylene). Other suitable surfactants can also be used as will be understood by those with skill in the art with reference to the disclosure in this disclosure.

Filters Containing an Additional Substance

The filter can additionally include one or more other substances which filter or inactivate toxic or mutagenic components of tobacco smoke. Examples of such substances include antioxidant and radical scavengers such as glutathione, cysteine, N-acetylcysteine, mesna, ascorbate, and N,N'-diphenyl-p-phenyldiamine; aldehyde inactivators such as ene-diol compounds, amines, and aminothiols; nitrosamine traps and carcinogen inactivators such as ion-exchange resins, chlorophyll; and nicotine traps such as tannic acid and other organic acids. In one preferred embodiment, the filter includes colloidal silica, a compound which can scavenge secondary amines from tobacco smoke, thereby preventing conversion of the secondary amines to nitrosamines in the body. Other suitable substances can also be used as will be understood by those with skill in the art with reference to the disclosure in this disclosure. In a preferred embodiment, the other substances are present in an amount of from about 0. 1 to about 10%, and more preferably from about 0.1 to about 2% by weight of the filter.

Filters Having Certain Combinations of Substances Disclosed in this Disclosure

According to another embodiment of the present invention, there is provided a tobacco smoke filter comprising combinations of substances disclosed in this disclosure. In a preferred embodiment, the filter comprises a humectant, such as sodium pyroglutamate, in combination with dry water. This combination functions synergistically to improve wet-filtration of tobacco smoke. In one embodiment, the filter comprises sodium pyroglutamate in an amount of between about 1% and 20% of the aqueous portion of the dry water by weight. In a preferred embodiment, the filter comprises sodium pyroglutamate in an amount of between about 5% and 10% of the aqueous portion of the dry water by weight.

In another preferred embodiment, the filter comprises a copper-containing porphyrin, such as copper phthalocyanine, in combination with a humectant such as sodium pyroglutamate, dry water or both. These combinations are particularly preferred because copper-containing porphyrins scavenge carcinogens better in aqueous environments. In one embodiment, the copper-containing porphyrin comprises between about 0.5% to about 5% of the dry water by weight.

In another preferred embodiment, the filter comprises chlorophyllin, in combination with a humectant, dry water or both. In one embodiment, the chlorophyllin comprises between about 0.5% to about 5% of the dry water and the humectant is between about 1% and 20% of the dry water by weight.

A specific example of such a combination would be blue rayon (copper phthalocyanine impregnated rayon) combined with dry water. When present in an amount between about 10 mg to 100 mg in the 3 mm tobacco end of a standard cellulose acetate tobacco smoke filter, the combination does not impair draw but reduces mutagenicity of tobacco smoke 75–80% by the Ames test. Further, these components are inexpensive, safe, and not harmful to the environment.

Combinations of dry water and porphyrin are produced, for example, by adding dry porphyrin in amounts up to the amount of methylated silica by weight to dry water, made according the description in this disclosure. The porphyrin must be added after the dry water has been stably emulsified. Dissolution of porphyrin in water prior to emulsification in methylated silica results in an unstable porphyrin/dry water compound. In a preferred embodiment, the porphyrin is added in amounts of about 0.1 to 0.5 grams per gram of methylated silica. A similar method is used to produce the combination of dry water and porphyrin-derivatized fiber, such as blue cotton or blue rayon. After combining the two substances, the combination is shaken or stirred to homogeneity.

Filters Having a Circumferential Barrier

Filters according to the present invention are preferably provided with an exterior, circumferential, moisture-impervious barrier or casing to prevent wetting of the smoker's hands. Such a barrier can be made from a polymeric material such as ethylvinyl acetate copolymer, polypropylene, or nylon, as is understood by those with skill in the art.

Position of Substances within Filters

The substances disclosed in this disclosure can be incorporated into filters according to the present invention in a variety of configurations. For example, the substance or substances can be dispersed throughout the filter in a substantially uniform manner. Alternately, the substance or substances can be dispersed in only one segment of the filter such as in the proximal third (the end nearest the smoker), in the middle third or in the distal third (the end nearest the tobacco).

In another embodiment, at least one substance is dispersed in one segment of the filter and at least one other substance is dispersed in a different segment of the filter. The two segments can have overlapping areas. For example, a filter according to the present invention can have dry water dispersed in the distal third of the filter and a copper-containing porphyrin dispersed in the proximal third of the filter. Also for example, a filter according to the present invention can have microcapsules dispersed in the distal half of the filter and sodium pyroglutamate dispersed in the proximal two-thirds of the filter, such that the two substances are dispersed in an overlapping area of the filter as well as nonoverlapping areas.

In another embodiment, the substance or substances can be incorporated into a filter that is then affixed to an end of a standard tobacco smoke filter. In a preferred embodiment, the substance or substances are incorporated into a tobacco smoke filter that resembles a shortened version of a standard tobacco smoke filter, and the shortened filter is then affixed to an end of a standard tobacco smoke filter. In this embodiment, the user will not be overtly aware of the additional shortened filter because of its resemblance in construction to a standard filter, unlike commercially available filters which add onto the proximal end of a smokable device.

Further, the substance or substances according to the present invention can be incorporated into a layer of the filter between the fibrous material making up the remainder of the filter, and the body of divided tobacco.

Smokable Devices Incorporating Filters According to the Present Invention

According to another embodiment of the present invention, there is provided a smokable device comprising a tobacco smoke filter as disclosed in this disclosure affixed to a body of divided tobacco. For example, such a smokable device can be a cigarette incorporating a filter containing microcapsules having sodium pyroglutamate dispersed in the porous substrate.

Method of Filtering Tobacco

According to another embodiment of the present invention, there is provided a method of filtering tobacco in a smokable device. The method comprises the steps of, first, providing a smokable device comprising the tobacco smoke filter according to the present invention affixed to a body of divided tobacco. Next, the body of divided tobacco is ignited such that smoke passes through the body and into the filter. Then, the smoke is allowed to pass through the filter thereby filtering the smoke.

Method of Making a Smokable Device

According to another embodiment of the present invention, there is provided a method of making a smokable device. The method comprises the steps of, first, providing a tobacco smoke filter according to the present invention. Next, the filter is affixed to a body of divided tobacco.

Although the present invention has been discussed in considerable detail with reference to certain preferred embodiments thereof, other embodiments are possible. Therefore, the spirit and scope of the appended claims should not be limited to the description of the preferred embodiments contained in this disclosure.

What is claimed is:

1. A method of making a first tobacco smoke filter segment, comprising the steps of:

(a) providing one or more than one copper-containing porphyrin;

(b) producing a mixture of cellulose fiber, sodium sulfate, chlorine water and the copper-containing porphyrin;

(c) heating the mixture for a sufficient time at one or more than one temperature sufficient to covalently link the copper-containing porphyrin to the cellulose fiber; and (d) forming the cellulose fiber with covalently bound, copper-containing porphyrin into the first tobacco smoke filter segment.

2. The method of claim 1, where the copper-containing porphyrin provided is a copper phthalocyanine.

3. The method of claim 1, where the copper-containing porphyrin provided is C.I. Reactive Blue 21 dye.

4. The method of claim 1, where the mixture of cellulose fiber and the copper-containing porphyrin produced comprises a ratio of about 1.2:10 copper-containing porphyrin to cellulose fiber by weight.

5. The method of claim 1, further comprising rinsing the mixture of cellulose fiber with covalently bound, copper-containing porphyrin after heating the mixture.

6. The method of claim 1, further comprising adding one or more than one additional substance to the cellulose fiber with covalently bound, copper-containing porphyrin.

7. The method of claim 6, where the one or more than one additional substance is selected from the group consisting of activated charcoal, chitin and lignin.

8. The method of claim 6, where the one or more than one additional substance is selected from the group consisting of an antioxidant, dry water, a humectant, microcapsules, a radical scavenger, a surfactant and combinations of the preceding.

9. A method of making a smokable device comprising the steps of:

(a) providing a first tobacco smoke filter segment made according to claim 1; and (b) affixing the first tobacco smoke filter segment to a body of divided tobacco.

10. The method of claim 9, further comprising the step of affixing a second tobacco smoke filter segment that is substantially free of copper-containing porphyrin to the body of divided tobacco.

11. The method of claim 10, where the second tobacco smoke filter segment affixed to the body of divided tobacco comprises cellulose acetate fibers treated with triacetin.

12. A tobacco smoke filter comprising a first tobacco smoke filter segment made according to claim 1.

13. A tobacco smoke filter comprising a first tobacco smoke filter segment made according to claim 1, and further comprising a second tobacco smoke filter segment that is substantially free of copper-containing porphyrin.

14. A smokable device comprising the tobacco smoke filter according to claim 12 affixed to a body of divided tobacco.

15. A smokable device comprising the tobacco smoke filter according to claim 13 affixed to a body of divided tobacco.

16. A method of filtering tobacco smoke comprising the steps of:

(a) providing the smokable device of claim 14;

(b) igniting the body of divided tobacco such that smoke passes through the body of divided tobacco and into the filter; and (c) allowing the smoke to pass through the filter thereby filtering the smoke.

17. A method of filtering tobacco smoke comprising the steps of:

(a) providing the smokable device of claim 15;

(b) igniting the body of divided tobacco such that smoke passes through the body of divided tobacco and into the filter; and (c) allowing the smoke to pass through the filter thereby filtering the smoke.

18. A method of making a first tobacco smoke filter segment, comprising the steps of:

(a) providing an iron analog of C.I. Reactive Blue 21 dye;

(b) producing a mixture of cellulose fiber and the iron analog of C.I. Reactive Blue 21 dye;

(c) heating the mixture for a sufficient time at one or more than one temperature sufficient to covalently link the iron analog of C.I. Reactive Blue 21 dye to the cellulose fiber; and (d) forming the cellulose fiber with covalently bound iron analog of C.I. Reactive Blue 21 dye into the first tobacco smoke filter segment.

19. The method of claim 18, where the mixture of cellulose fiber and the iron analog of C.I. Reactive Blue 21 dye further comprises sodium sulfate and chlorine water.

20. The method of claim 18, further comprising rinsing the mixture of cellulose fiber with covalently bound iron analog of C.I. Reactive Blue 21 dye after heating the mixture.

21. The method of claim 18, further comprising adding one or more than one additional substance to the cellulose fiber with covalently bound, copper-containing porphyrin.

22. The method of claim 21, where the one or more than one additional substance is selected from the group consisting of activated charcoal, chitin and lignin.

23. The method of claim 21, where the one or more than one additional substance is selected from the group consisting of an antioxidant, dry water, a humectant, microcapsules, a radical scavenger, a surfactant and combinations of the preceding.

24. A method of making a smokable device comprising the steps of:

(a) providing a first tobacco smoke filter segment made according to claim 18; and (b) affixing the first tobacco smoke filter segment to a body of divided tobacco.

25. The method of claim 24, further comprising the step of affixing a second tobacco smoke filter segment that is substantially free of iron analog of C.I. Reactive Blue 21 dye to the body of divided tobacco.

26. The method of claim 25, where the second tobacco smoke filter segment affixed to the body of divided tobacco comprises cellulose acetate fibers treated with triacetin.

27. A tobacco smoke filter comprising a first tobacco smoke filter segment made according to claim 18.

28. A tobacco smoke filter comprising a first tobacco smoke filter segment made according to claim 18, and further comprising a second tobacco smoke filter segment that is substantially free of iron analog of C.I. Reactive Blue 21 dye.

29. A smokable device comprising the tobacco smoke filter according to claim 27 affixed to a body of divided tobacco.

30. A smokable device comprising the tobacco smoke filter according to claim 28 affixed to a body of divided tobacco.

31. A method of filtering tobacco smoke comprising the steps of:

(a) providing the smokable device of claim 29;

(b) igniting the body of divided tobacco such that smoke passes through the body of divided tobacco and into the filter; and (c) allowing the smoke to pass through the filter thereby filtering the smoke.

32. A method of filtering tobacco smoke comprising the steps of:

(a) providing the smokable device of claim 30;

(b) igniting the body of divided tobacco such that smoke passes through the body of divided tobacco and into the filter; and (c) allowing the smoke to pass through the filter thereby filtering the smoke.

33. An iron analog of C.I. Reactive Blue 21 dye.

34. Paper impregnated with an iron analog of C.I. Reactive Blue 21 dye.

35. A method of making a first tobacco smoke filter segment, comprising the steps of:

(a) providing one or more than one copper-containing porphyrin;

(b) producing a mixture of cellulose fiber and the copper-containing porphyrin;

(c) heating the mixture for a sufficient time at one or more than one temperature sufficient to covalently link the copper-containing porphyrin to the cellulose fiber;

(d) rinsing the mixture of cellulose fiber with covalently bound, copper-containing porphyrin after heating the mixture; and (e) forming the cellulose fiber with covalently bound, copper-containing porphyrin into the first tobacco smoke filter segment.

36. The method of claim 35, where the copper-containing porphyrin provided is a copper phthalocyanine.

37. The method of claim 35, where the copper-containing porphyrin provided is C.I. Reactive Blue 21 dye.

38. The method of claim 35, where the mixture of cellulose fiber and the copper-containing porphyrin produced comprises a ratio of about 1.2:10 copper-containing porphyrin to cellulose fiber by weight.

39. The method of claim 35, where the mixture of cellulose fiber and the copper-containing porphyrin further comprises sodium sulfate and chlorine water.

40. The method of claim 35, further comprising adding one or more than one additional substance to the cellulose fiber with covalently bound, copper-containing porphyrin.

41. The method of claim 40, where the one or more than one additional substance is selected from the group consisting of activated charcoal, chitin and lignin.

42. The method of claim 40, where the one or more than one additional substance is selected from the group consisting of an antioxidant, dry water, a humectant, microcapsules, a radical scavenger, a surfactant and combinations of the preceding.

43. A method of making a smokable device comprising the steps of:

(a) providing a first tobacco smoke filter segment made according to claim 1; and (b) affixing the first tobacco smoke filter segment to a body of divided tobacco.

44. The method of claim 43, further comprising the step of affixing a second tobacco smoke filter segment that is substantially free of copper-containing porphyrin to the body of divided tobacco.

45. The method of claim 44, where the second tobacco smoke filter segment affixed to the body of divided tobacco comprises cellulose acetate fibers treated with triacetin.

46. A tobacco smoke filter comprising a first tobacco smoke filter segment made according to claim 35.

47. A tobacco smoke filter comprising a first tobacco smoke filter segment made according to claim 35, further comprising a second tobacco smoke filter segment that is substantially free of copper-containing porphyrin.

48. A smokable device comprising the tobacco smoke filter according to claim 46 affixed to a body of divided tobacco.

49. A smokable device comprising the tobacco smoke filter according to claim 47 affixed to a body of divided tobacco.

50. A method of filtering tobacco smoke comprising the steps of:

(a) providing the smokable device of claim 48;

(b) igniting the body of divided tobacco such that smoke passes through the body of divided tobacco and into the filter; and (c) allowing the smoke to pass through the filter thereby filtering the smoke.

51. A method of filtering tobacco smoke comprising the steps of:

(a) providing the smokable device of claim 49;

(b) igniting the body of divided tobacco such that smoke passes through the body of divided tobacco and into the filter; and (c) allowing the smoke to pass through the filter thereby filtering the smoke.

52. A method of making a smokable device comprising the steps of:

(a) providing a first tobacco smoke filter segment made by;

i) providing one or more than one copper-containing porphyrin;

ii) producing a mixture of cellulose fiber and the copper-containing porphyrin;

iii) heating the mixture for a sufficient time at one or more than one temperature sufficient to covalently link the copper-containing porphyrin to the cellulose fiber; and iv) forming the cellulose fiber with covalently bound, copper-containing porphyrin into the first tobacco smoke filter segment;

(b) affixing the first tobacco smoke filter segment to a body of divided tobacco; and (c) affixing a second tobacco smoke filter segment that is substantially free of copper-containing porphyrin to the body of divided tobacco.

53. The method of claim 52, where the copper-containing porphyrin provided in step (a) is a copper phthalocyanine.

54. The method of claim 52, where the copper-containing porphyrin provided in step (a) is C.I. Reactive Blue 21 dye.

55. The method of claim 52, where the mixture of cellulose fiber and the copper-containing porphyrin produced comprises a ratio of about 1.2:10 copper-containing porphyrin to cellulose fiber by weight.

56. The method of claim 52, where the mixture of cellulose fiber and the copper-containing porphyrin further comprises sodium sulfate and chlorine water.

57. The method of claim 52, further comprising rinsing the mixture of cellulose fiber with covalently bound, copper-containing porphyrin after heating the mixture.

58. The method of claim 52, further comprising adding one or more than one additional substance to the cellulose fiber with covalently bound, copper-containing porphyrin.

59. The method of claim 58, where the one or more than one additional substance is selected from the group consisting of activated charcoal, chitin and lignin.

60. The method of claim 58, where the one or more than one additional substance is selected from the group consisting of an antioxidant, dry water, a humectant, microcapsules, a radical scavenger, a surfactant and combinations of the preceding.

61. The method of claim 52, where the second tobacco smoke filter segment affixed to the body of divided tobacco comprises cellulose acetate fibers treated with triacetin.

62. A smokable device made according to claim 52.

63. A method of filtering tobacco smoke comprising the steps of:

(a) providing the smokable device of claim 62;

(b) igniting the body of divided tobacco such that smoke passes through the body of divided tobacco and into the filter; and (c) allowing the smoke to pass through the filter thereby filtering the smoke.

64. A tobacco smoke filter comprising:

(a) a first tobacco smoke filter segment made by a method comprising the steps of:

(i) providing one or more than one copper-containing porphyrin;

(ii) producing a mixture of cellulose fiber and the copper-containing porphyrin;

(iii) heating the mixture for a sufficient time at one or more than one temperature sufficient to covalently link the copper-containing porphyrin to the cellulose fiber; and (iv) forming the cellulose fiber with covalently bound, copper-containing porphyrin into the first tobacco smoke filter segment; and further comprising a second tobacco smoke filter segment that is substantially free of copper-containing porphyrin.

65. A smokable device comprising the tobacco smoke filter according to claim 64 affixed to a body of divided tobacco.

66. A method of filtering tobacco smoke comprising the steps of:

(a) providing the smokable device of claim 65;

(b) igniting the body of divided tobacco such that smoke passes through the body of divided tobacco and into the filter; and (c) allowing the smoke to pass through the filter thereby filtering the smoke.

* * * * *